US012714026B2

(12) United States Patent
Carney

(10) Patent No.: US 12,714,026 B2
(45) **Date of Patent: *Aug. 25, 2026**

(54) BALE FEEDER WITH ELEVATOR PLATFORM

(71) Applicant: PROFILE PRODUCTS L.L.C., Buffalo Grove, IL (US)

(72) Inventor: Nathan Albert Carney, Mableton, GA (US)

(73) Assignee: PROFILE PRODUCTS L.L.C., Buffalo Grove, IL (US)

( * ) Notice: Subject to any disclaimer, the term of this patent is extended or adjusted under 35 U.S.C. 154(b) by 339 days.

This patent is subject to a terminal disclaimer.

(21) Appl. No.: 18/287,122

(22) PCT Filed: Apr. 18, 2022

(86) PCT No.: PCT/US2022/025220

§ 371 (c)(1),
(2) Date: Oct. 16, 2023

(87) PCT Pub. No.: WO2022/221763

PCT Pub. Date: Oct. 20, 2022

(65) Prior Publication Data

US 2024/0198353 A1 Jun. 20, 2024

Related U.S. Application Data

(60) Provisional application No. 63/175,828, filed on Apr. 16, 2021.

(51) Int. Cl.

*A01D 87/12* (2006.01)
*A01F 29/00* (2006.01)

(Continued)

(52) U.S. Cl.

CPC .......... *A01D 87/127* (2013.01); *A01F 29/005* (2013.01); *B02C 18/142* (2013.01); *B02C 18/2241* (2013.01); *A01D 2087/128* (2013.01)

(58) Field of Classification Search

CPC ..... A01F 29/005; A01F 29/10; A01D 87/127; A01D 87/0007; A01D 87/02; B02C 18/22; B02C 18/2225; B02C 18/2233

See application file for complete search history.

(56) References Cited

U.S. PATENT DOCUMENTS 4,018,391 A 4/1977 Jacobsen
4,227,654 A * 10/1980 Seefeld ................ A01F 29/005 241/34

(Continued)

FOREIGN PATENT DOCUMENTS

EP 1914344 A1 4/2008
WO 1994003043 A1 2/1994

OTHER PUBLICATIONS

PCT Search Report and Written Opinion for PCT/US2022/025220, dated Jul. 13, 2022, 15 pages.

(Continued)

*Primary Examiner* — Matthew Katcoff
(74) *Attorney, Agent, or Firm* — BROOKS KUSHMAN P.C.

(57) ABSTRACT

In at least one embodiment, a bale feeder assembly is provided comprising a housing having side walls and a feed assembly disposed between the side walls. The feed assembly has a proximal end and a distal end, and is structured to move a bale of material. The bale feeder also has a movable platform connected to the proximal end of the feed assembly to move the bale along the housing, and wherein the (Continued)

movable platform is rotatable between a generally horizontal position and a generally perpendicular position relative to the housing. The bale feeder also has a shredder disposed adjacent the distal end of the feed assembly to shred the bale, the feed assembly being disposed at an angle such that the proximal end is in a plane spaced below a plane the distal end is disposed in and the feed assembly with the movable platform is capable of moving a bale of material or a portion of a bale of material towards the shredder for shredding.

20 Claims, 11 Drawing Sheets

(51) Int. Cl.
*B02C 18/14* (2006.01)
*B02C 18/22* (2006.01)

(56) References Cited

U.S. PATENT DOCUMENTS 4,321,996 A * 3/1982 Sancken ................ A01D 87/02
198/821
6,261,410 B1 7/2001 Flecken et al.
6,629,654 B2 * 10/2003 Neely .................. B65F 1/1646
241/101.5
10,212,890 B2 * 2/2019 Rohrer .................... A01F 29/12
10,266,457 B2 4/2019 Spittle et al.
10,363,716 B2 7/2019 Gaudreault
2014/0326817 A1 11/2014 Wentz et al.
2018/0057966 A1 3/2018 Spittle et al.

OTHER PUBLICATIONS

International Preliminary Report on Patentability (IPRP) dated Oct. 12, 2023, for PCT/US2022/025220, which issued in a related application. 7 pages.

* cited by examiner

BALE FEEDER WITH ELEVATOR PLATFORM

CROSS-REFERENCE TO RELATED APPLICATION

This application claims priority to PCT Application No. PCT/US2022/025220, filed Apr. 18, 2022, which claims the benefit of U.S. provisional application Ser. No. 63/175,828 filed Apr. 16, 2021, the disclosures of which are hereby incorporated in their entirety by reference herein.

TECHNICAL FIELD

Various embodiments related to a bale feeder with an elevator plate.

BACKGROUND

Bale feeders have included a movable flooring, like a conveyor belt, that has slats for breaking the bales into fibrous fragments and for carrying fibrous fragments towards spinning blades that further shred the fiber.

SUMMARY

According to an embodiment, a bale feeder assembly is provided with a feed assembly and a movable platform. In at least one embodiment, the movable platform is connected to and moves with the feed assembly relative to a floor. In yet another embodiment, the speed of the feed assembly and movable platform can be controlled to optimize the throughput of the bale feeder. In at least one embodiment, the feed assembly has a proximal end and a distal end. The feed assembly is movable and can move a bale of material along the housing. In one position, the platform connects to the proximal end of the feed assembly to move the bale along the housing. The platform can rotate between a generally horizontal position and a generally perpendicular position relative to at least a portion of the feed assembly. The bale feeder is provided with a shredder disposed adjacent to the distal end of the feed assembly to shred the bale. The feed assembly is disposed at an angle such that in one position the proximal end is in a plane spaced below a plane of the distal end. The feed assembly with the movable platform is capable of moving a bale of material or a portion of a bale of material towards the shredder for shredding.

According to a further embodiment, the bale feeder is provided with a pair of rail members. Each individual rail member is connected to a respective side wall portion of the feeder.

According to another further embodiment, the bale feeder is further provided with a drive chain. In at least one embodiment, the drive chain is disposed below an underside of each of the individual rails, and pulls the feed assembly and the connected platform towards the shredder.

According to another even further embodiment, the platform is attached to the feed assembly. As the drive chain pulls the feed assembly towards the shredder, the drive chain also pulls the platform from a generally horizontal position to a generally perpendicular position relative to the floor. In the generally horizontal position, the platform is angled about 150 degrees relative to the feed assembly and in the generally perpendicular position, the platform is about 90 degree relative to feed assembly. It should be understood that these angles are examples of suitable angles. However, any suitable angle could be employed as long as in the horizontal position the platform enables relatively easy loading of a bale of material, likely on a pallet, onto the feed assembly, and in the generally perpendicular position, the platform helps to retain the bale in the bale feeder. In at least one embodiment, in the generally horizontal position, the platform can be angled about 120-220 degrees relative to the feed assembly and in the generally perpendicular position, the platform can be angled 30-110 degree relative to feed assembly.

According to another even further embodiment, the shredder is provided with a spinning blade.

According to yet another even further embodiment, the shredder is provided with a plurality of spinning blades.

According to yet another even further embodiment, the movable platform, when in a perpendicular position, moves along with the feed assembly as the feed assembly moves one or more bales towards the shredder.

DETAILED DESCRIPTION

Figure 1:
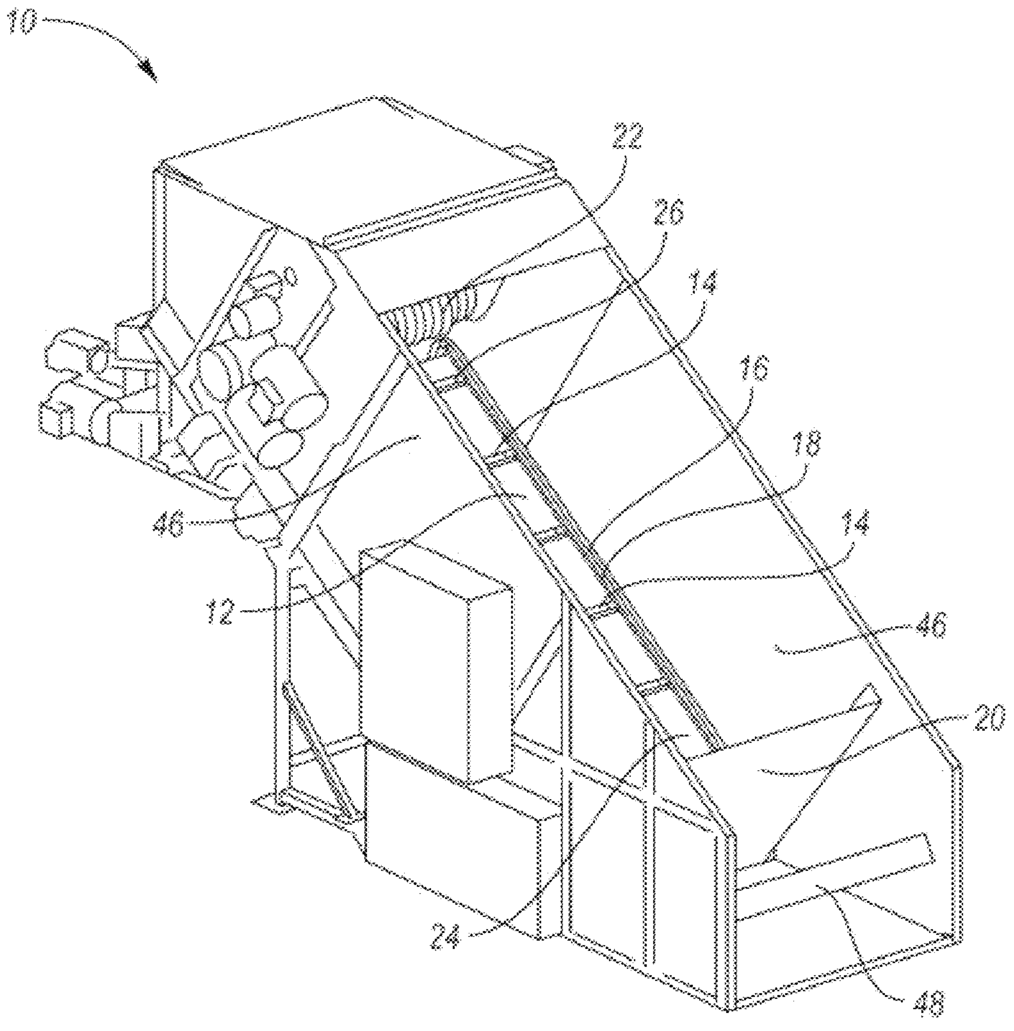
FIG. 1 is a side perspective view of a bale feeder according to an embodiment.

Reference will now be made in detail to compositions, embodiments, and methods of the present disclosure known to the inventors. However, it should be understood that disclosed embodiments are merely exemplary of the present disclosure which may be embodied in various and alternative forms. Therefore, specific details disclosed herein are not to be interpreted as limiting, rather merely as representative bases for teaching one skilled in the art to variously employ the present disclosure.

Except where expressly indicated, all numerical quantities in this description indicating amounts of material or conditions of reaction and/or use are to be understood as modified by the word "about" in describing the broadest scope of the present disclosure.

The description of a group or class of materials as suitable for a given purpose in connection with one or more embodiments of the present disclosure implies that mixtures of any two or more of the members of the group or class are suitable. Description of constituents in chemical terms refers to the constituents at the time of addition to any combination specified in the description and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Shredding peat through a tilt over bale feeder has been used conventionally for several years. A standard bale peat feeder has a platform where a pallet of compressed peat/ material is placed. When the bale feeder is running, a chain, or any other suitable driving or pulling member, mechanically moves the floor towards a shredder and a separate mechanism rotates the platform up tipping the peat into a machine to be shredded. The platform is stationary in that other than rotating between an open and closed position, the platform is stationary and stays adjacent the end of the floor during the entire shredding operation. The movable floor is provided with slats that typically extend the width of the platform. The slats peat to the top of the machine scraping the bottom side of the bale of peat pulling small amounts of peat to be shredded. The operation continues until all, or most all, of the peat is gone. While this method words for peat bales, this standard method does not work for every type of material.

With fiber bales for example, the conventional peat shredding method discussed above does not allow for a consistent through put, therefore, making the conventional peat method less efficient than desired for other types of materials to be shredded. Some such materials are mulch compositions or growing mediums (i.e. fiber bales) containing fibers of wood and bark for instance, such as are disclosed in U.S. Pat. No. 10,266,457, which is incorporated by reference herein. The mulch composition or growing medium can be used alone or as an additive to peat. However, fiber bales made with this mulch composition or growing medium are typically more difficult to shred than a typical peat bale, in large part because of fiber entanglement. Therefore, the standard bale feeder for peat discussed earlier does not work nearly as efficiently with fiber bales as it does with peat bales.

With fiber bales, the slats disposed along the movable floor scrape against the fiber bales and break chunks off. This not only creates an inconsistent feed into the bale feeder, but it could also jam the machine. The main reason this happens is because the fiber in the wood fiber bales are considerably differently than the fiber in peat bales.

Thus, a new method of processing the bales, and thus a new bale shredder, is desired, with a primary goal of having a more consistent and/or predictable feed rate. A consistent feed rate or throughput can optimize the machine life and machine timing while creating a consistent finished work product.

In the method of the present disclosure, the movable platform is connected to a feed assembly. In a first embodiment, the feed assembly comprises a chain that pulls or drives the movable platform to lift a bale(s) towards the shredder. In at least one embodiment, the feed assembly includes a plurality of spaced apart slats connected to and driven by the chain, or other driving or pulling member. In at least another embodiment, the feed assembly includes the slats, the chain and a movable floor, such that the movable floor and the slats move together. In yet another embodiment, the feed assembly includes the movable floor and the chain, but does not include slats. Thus, the platform and the feed assembly move as one unit as the chain pulls the platform, either with or without the slats and/or the movable floor. Additionally, the platform connected with the feed assembly helps to move or push the fiber bale(s) up the housing of the bale feeder in one unit to prevent chunks from breaking off the bale prior to reaching the shredder. This helps create a more consistent feed and improve efficiency. In at least one embodiment, the speed of the drive chain 18, and thus the movable platform 20, can be constant. In at least another embodiment, the speed of the drive chain 18, and thus the movable platform 20, can vary as needed to accommodate desired throughput of the shredded material.

Figure 2:
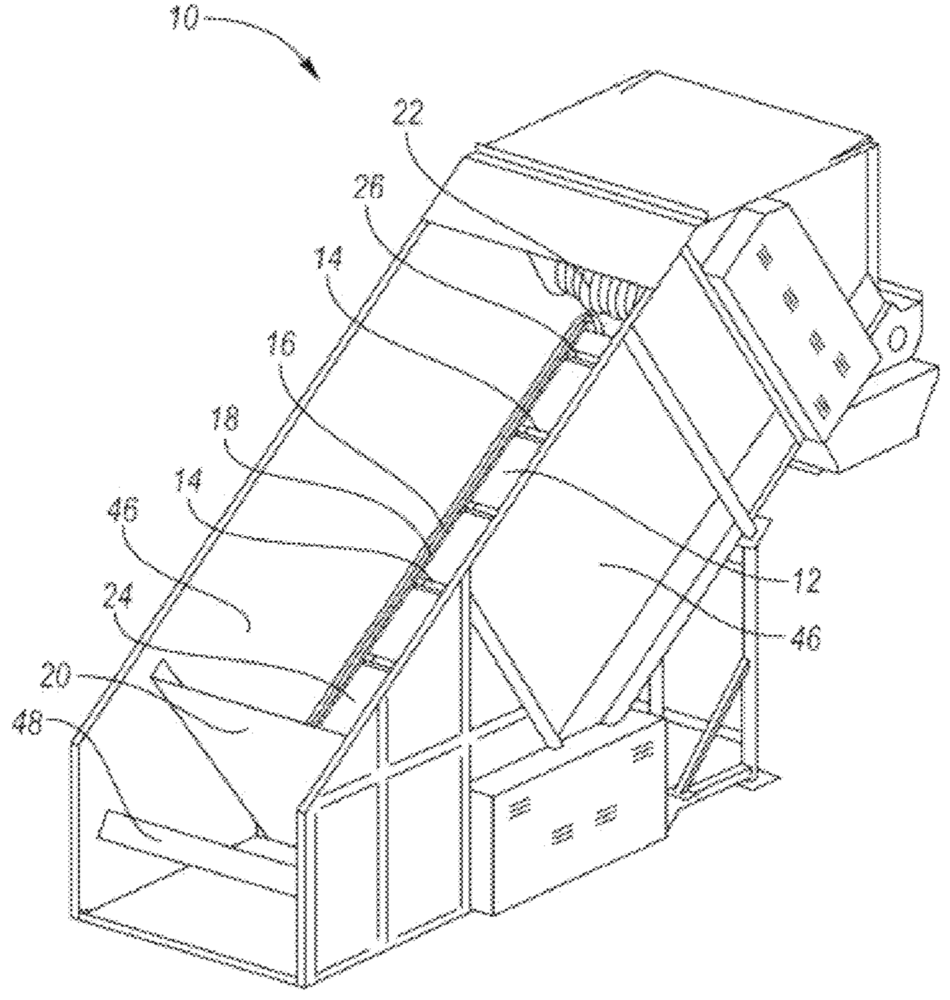
FIG. 2 is a rear perspective view of the bale feeder of FIG. 1.

FIGS. 1 and 2 illustrate a bale feeder 10 according to an embodiment. The bale feeder 10 includes a floor 12. The floor 12 can be made of any suitable material, and in at least one embodiment is made of metal, but could also be made of other materials such as plastic, rubber or fabric. In at least one embodiment, the floor 12 has a width of about 75 to 150 cm, in another embodiment of about 85 to 130 cm, and in still yet another embodiment of about 100 to 120 cm. In at least one embodiment, the movable floor 12 has a length of about 150 to 350 cm, in another embodiment of about 200 to 300 cm, and in still yet another embodiment of about 225 to 275 cm. While not necessary, in at least the illustrated embodiment, the bale feeder 10 includes a plurality of slats 14, such as metal slats 14, disposed incrementally along the length of the floor 12. In the illustrated embodiment, the bale feeder 10 also comprises a set of rails 16 located on either side of the floor 12 attached to the side walls of the feeder 10. As shown in the illustrated embodiments, underneath the set of rails 16 is a drive chain 18. It should be understood that other driving members could be employed, such as, but not limited to a cord, a rack, and a belt.

The bale feeder 10 is provided with a feed assembly 19 that moves the bale of material up the housing to a shredder 22. In at least one embodiment, the feed assembly 19 includes and is driven by the drive chain 18. In at least another embodiment, the feed assembly 19 includes the slats 14 and the drive chain 18 such that the slats are driven by the drive chain. In still yet another embodiment, the feed assembly 19 includes the slats 14, the floor 12 and the drive chain 18 such that the slats and the floor are driven together by the drive chain. In still yet another embodiment, the feed assembly 19 includes the floor 12 and the drive chain 18 such that the floor is driven by the drive chain. There is also a movable platform 20 located at a proximal end 24 of the floor 12, and a shredder 22 located at a distal end 26 of the floor 12.

The platform 20 is rotatable from a generally horizontal position to a generally perpendicular position as the platform is guided by the rails 16 while being pulled by the drive chain 18 pulling the floor 12. In at least one embodiment, the movable platform 20 has a width of about 75 to 225 cm, in another embodiment of about 100 to 200 cm, and in still yet another embodiment of about 130 to 175 cm. In at least one embodiment, the movable platform 20 has a length of about 75 to 225 cm, in another embodiment of about 100 to 200 cm, and in still yet another embodiment of about 130 to 175 cm. In at least one embodiment, the movable platform 20 has a thickness of about 0.25 to 20 cm, in another embodiment of about 1 to 10 cm, and in still yet another embodiment of about 2 to 7 cm. The platform 20 changes position from a generally horizontal position to a generally perpendicular position as the feed assembly 19 is pulled by the drive chain 18 and the platform is guided by the guide rails 16. While the bale feeder 10 is not in use, fiber bales or palleted bales of fibrous material can be loaded onto the movable floor 12. This loading can happen when the platform 20 in the generally horizontal position and is resting on the horizontal bar 48 at the end of the bale feeder 10. Once the bale feeder 10 is running, the drive chain 18 pulls the feed assembly 19 towards the shredder 22.

Simultaneously, the drive chain 18 in cooperation with the rails 16 pulls the platform 20 to the generally perpendicular position. While the platform 20 is in the generally perpendicular position, it moves along with the feed assembly 19 to guide and push the fiber bales up the bale feeder towards the shredder 22. In other words, the drive chain 18 not only pulls the feed assembly 19 to the shredder 22, but also pulls the platform 20 along with it so that the feed assembly 19 and the platform 20 move as one unit. This helps to inhibit relatively large chunks of the fiber bales from breaking off, as well as preventing the possibility of the bales crumbling over itself.

With previous methods, there was no movable platform similar to platform 20 that would move upwards with a movable feed assembly of the machine. Because of this, there was the possibility that the bales would get stuck on the floor or feed assembly and not move upwards fluidly. The feed assembly, however, would continue to move even though the bales were not moving at the same speed. This would cause the bale to compress and crumble. This could result in relatively large chunks of the bale falling completely off of the machine and onto the ground or into other mixes surrounding the machine. This can significantly affect the efficiency and feed rate of bale feeders.

Figure 3:
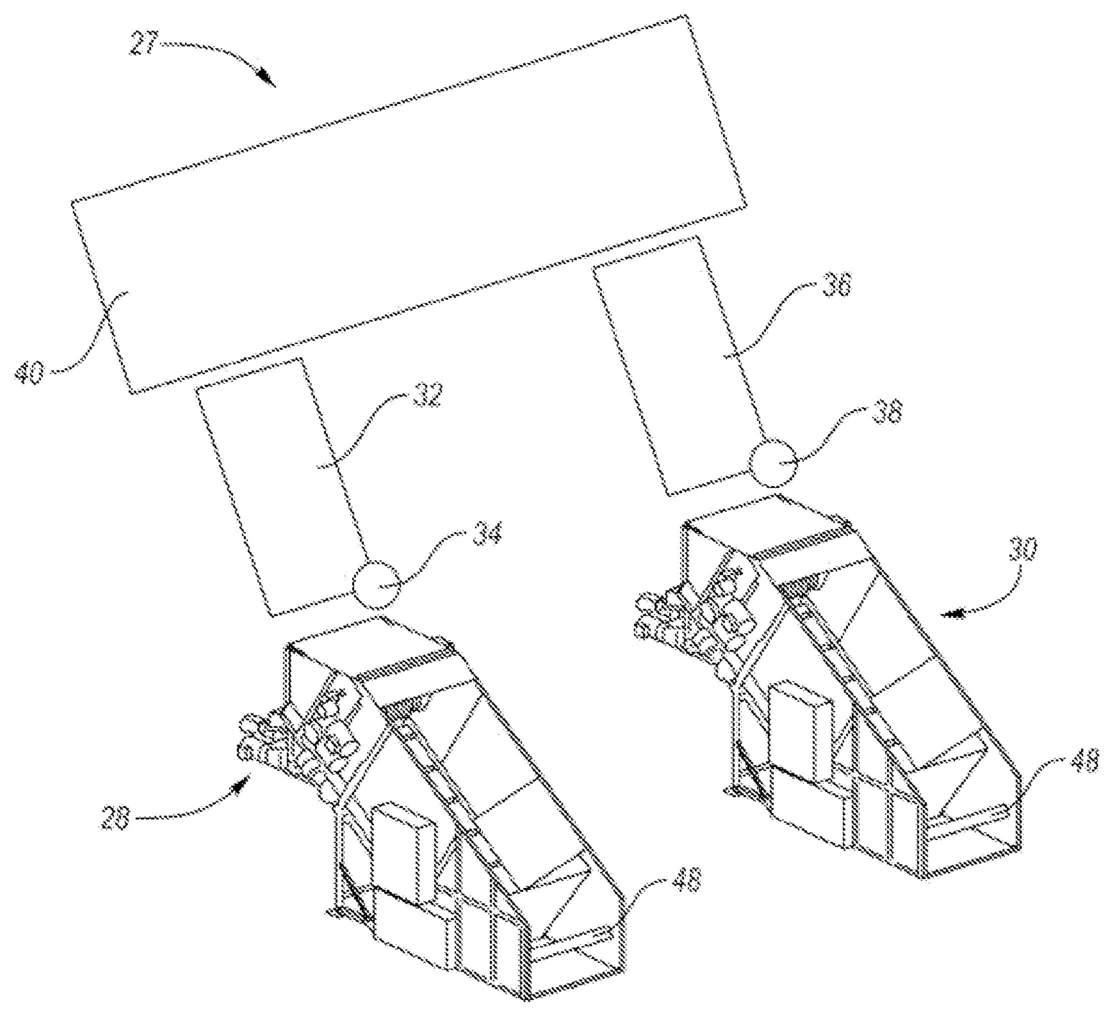
FIG. 3 is s schematic illustration of a mixing assembly according to an embodiment.

FIG. 3 illustrates an embodiment of a mixing assembly 27. The assembly 27 is provided with at least one bale feeder 10. In the illustrated embodiment in FIG. 3, a first bale feeder 28 and a second bale feeder 30 are provided. In at least the illustrated embodiment, the first bale feeder 28 is provided with a conveyor belt 32 and a sensor 34. Once the fiber bale is shredded, the material moves from the bale feeder 28 to the conveyor belt 32. The conveyor belt 32 will then move the material into a mixing bin 40. Similarly, in at least the illustrated embodiment, the second bale feeder 30 is also provided with a conveyor belt 36 and a sensor 38. The conveyor belt 36 for the second bale feeder 30 acts in the same way as the conveyor belt 32. In at least one embodiment, the fiber bale being processed in the first bale feeder 28 is a different type of fiber bale than the fiber bale being processed in the second bale feeder 30. For instance, the two different fiber bales could differ in material, and/or fiber size. The conveyor belt 32 and 36 can be programmable to adjust throughput with other component(s) to provide optimum throughput of component(s) to mix/maintain the desired formulation. The sensors (in this illustration) 34 and 38 help this process by measuring the amount of material is being placed on the conveyor belts 32 and 36. This helps to ensure that the proper amounts of each material are being placed in the mixing bin 40.

Figure 5:
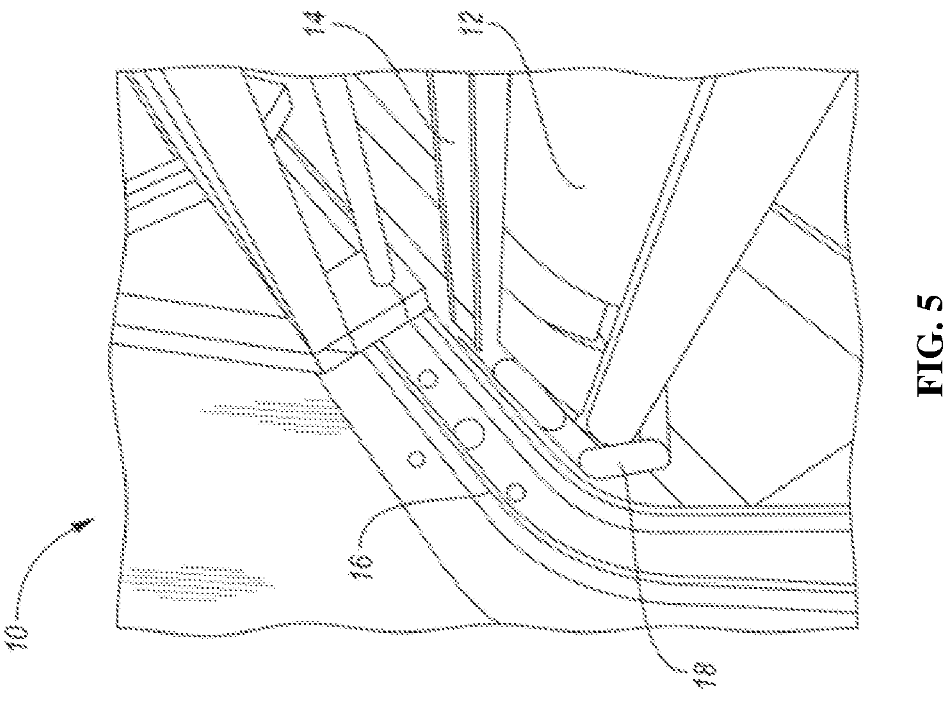
FIGS. 4-5 show rear portions of a bale feeder according to an embodiment.
Figure 4:
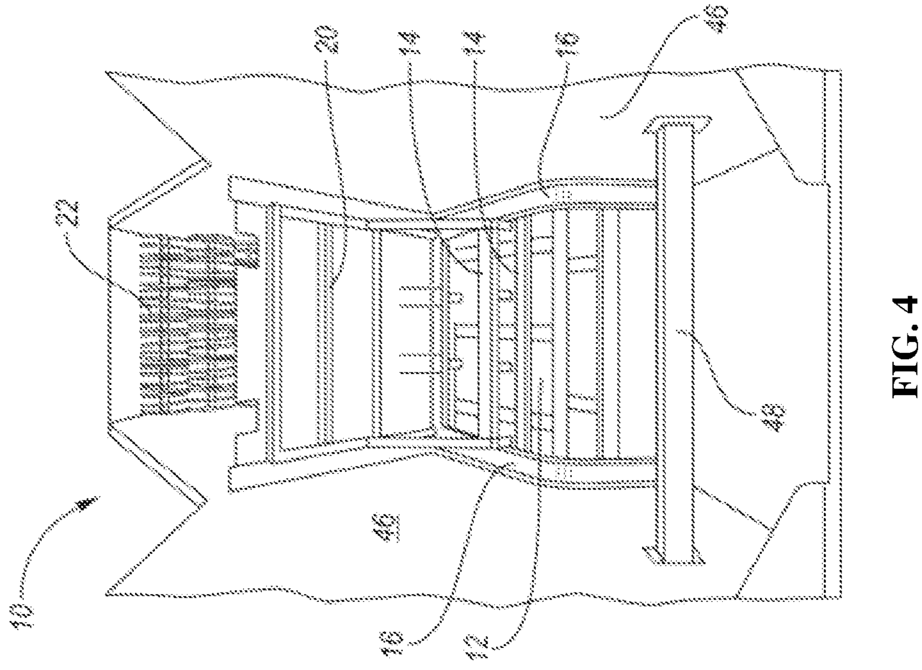
Figure 7:
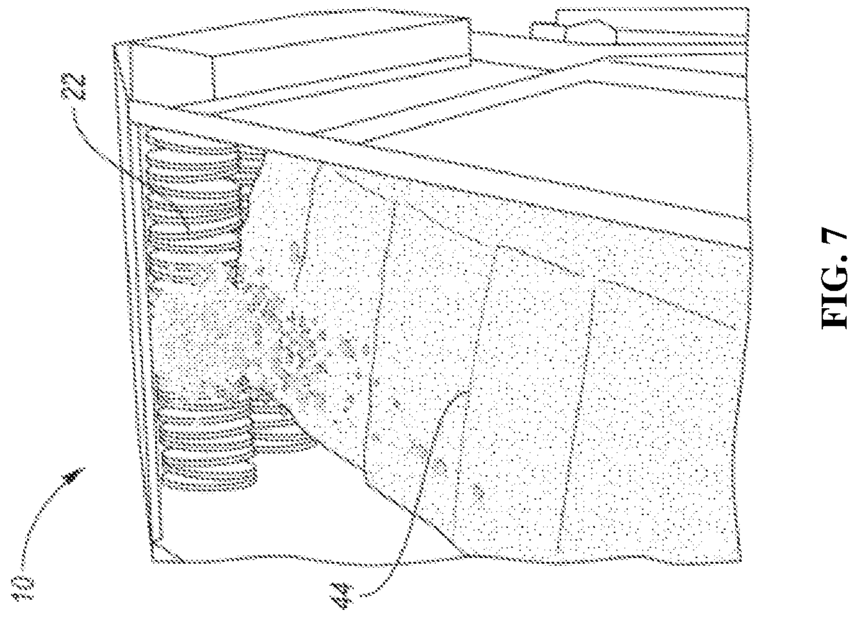
FIGS. 6-10 show one or more bales being processed through a bale feeding according to an embodiment.

FIGS. 4 and 5 illustrate a more detailed view of the rail 16 with the drive chain 18 according to an embodiment. Looking at FIG. 4, the movable platform 20 has been moved upwards towards the shredder 22. The rails 16 are disposed in sidewalls 46 on the sides of the platform 20 and the floor 12. Now referring to FIG. 5, it is shown that the rail 16 illustrated has spacing to allow for the platform 20 to fit within the rail 16. The drive chain 18 is also shown disposed below the rail 16, however it could be disposed elsewhere.

Figure 6:
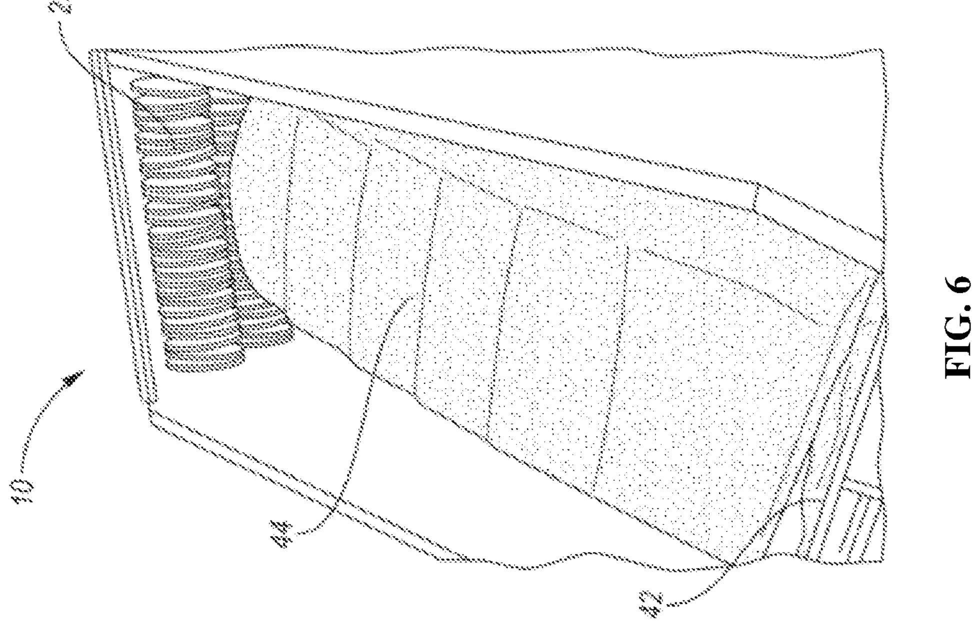
Figure 9:
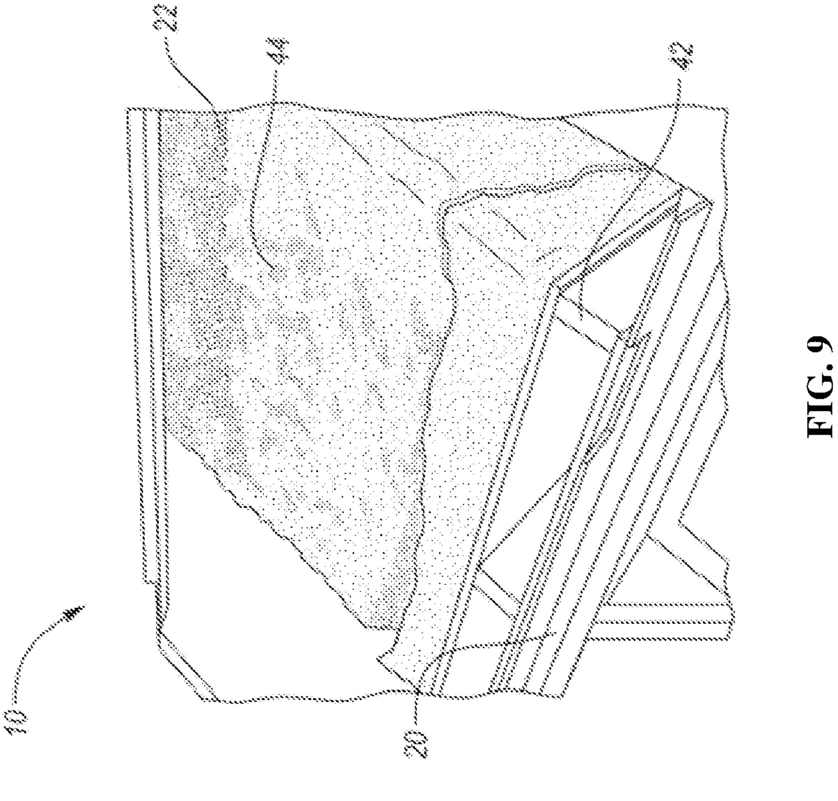
Figure 8:
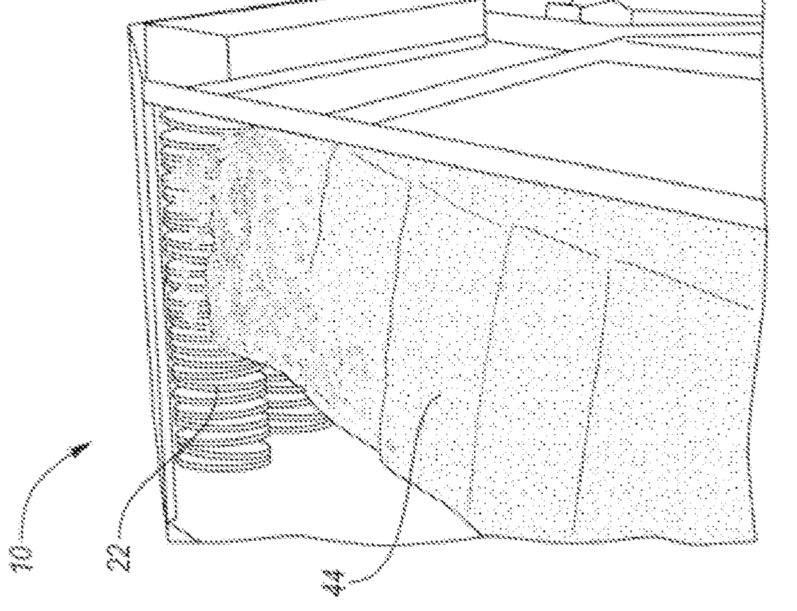
Figure 10:
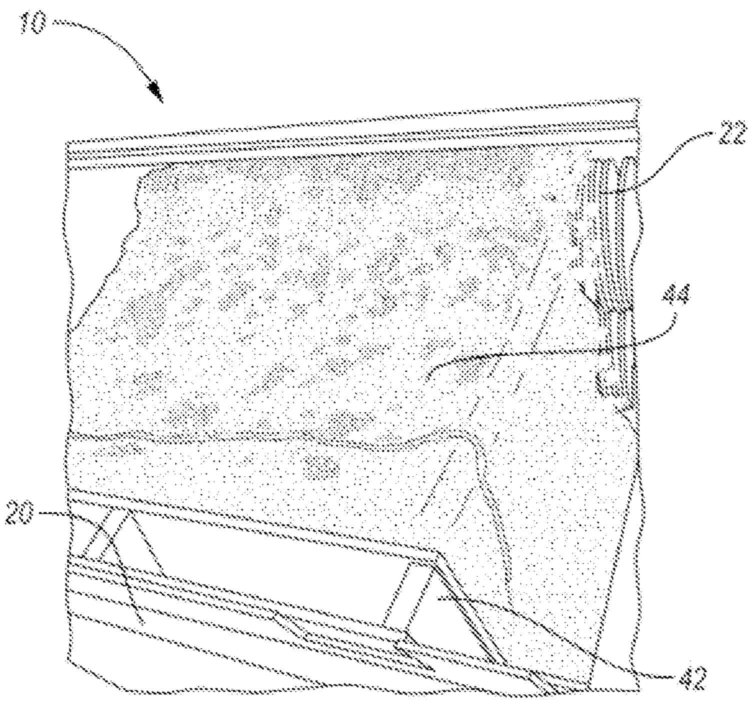
Figure 11:
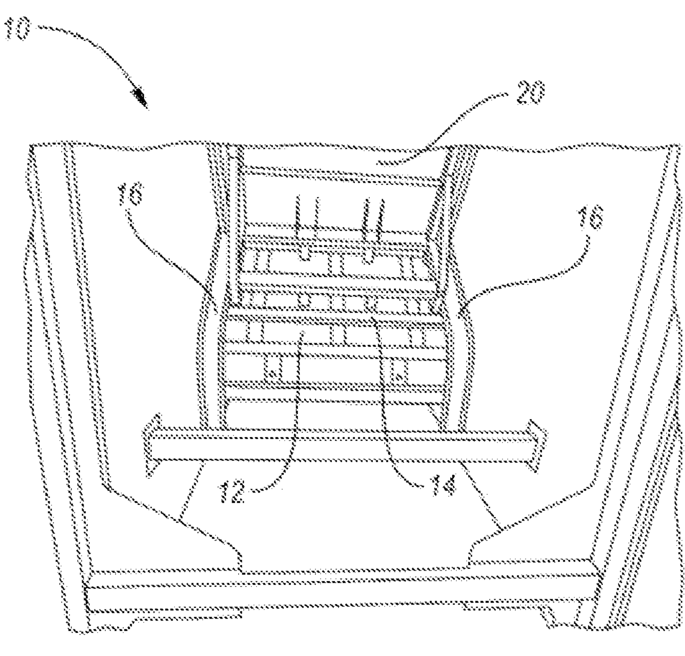
FIGS. 11-18 illustrate further embodiments of a bale feeder.
Figure 12:
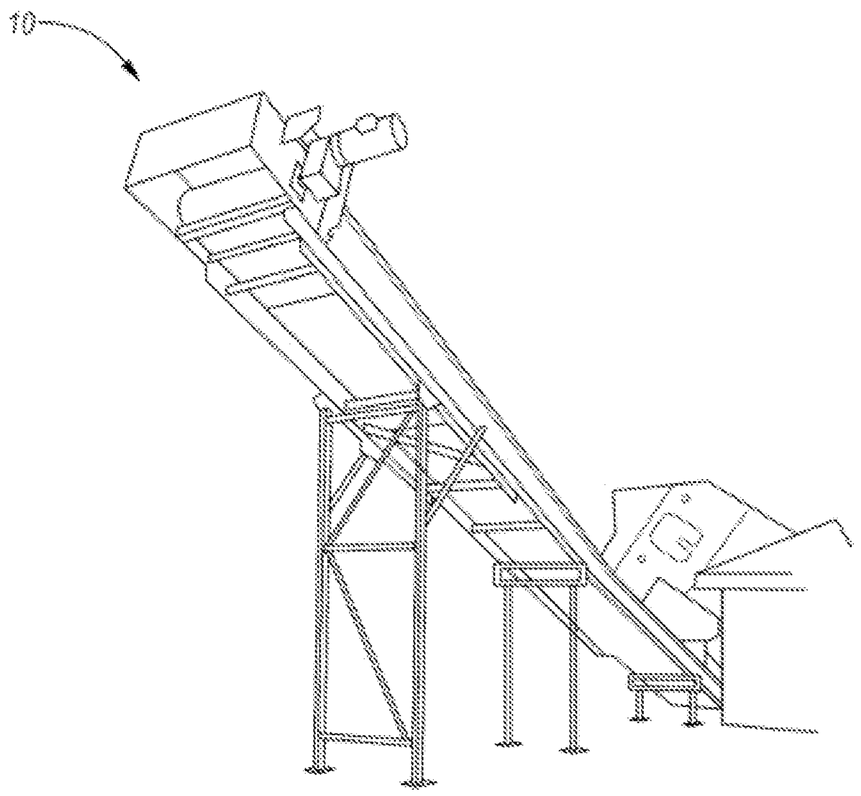
Figure 13:
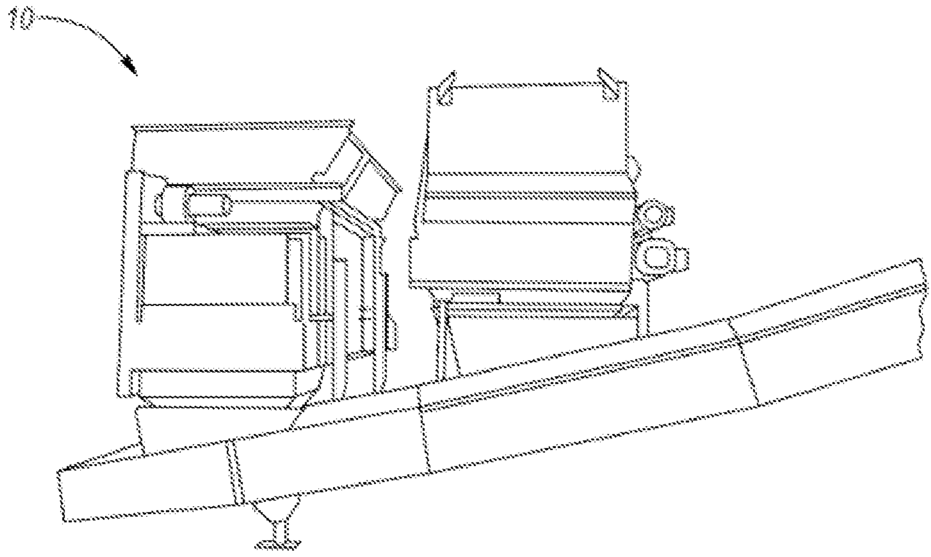
Figure 14:
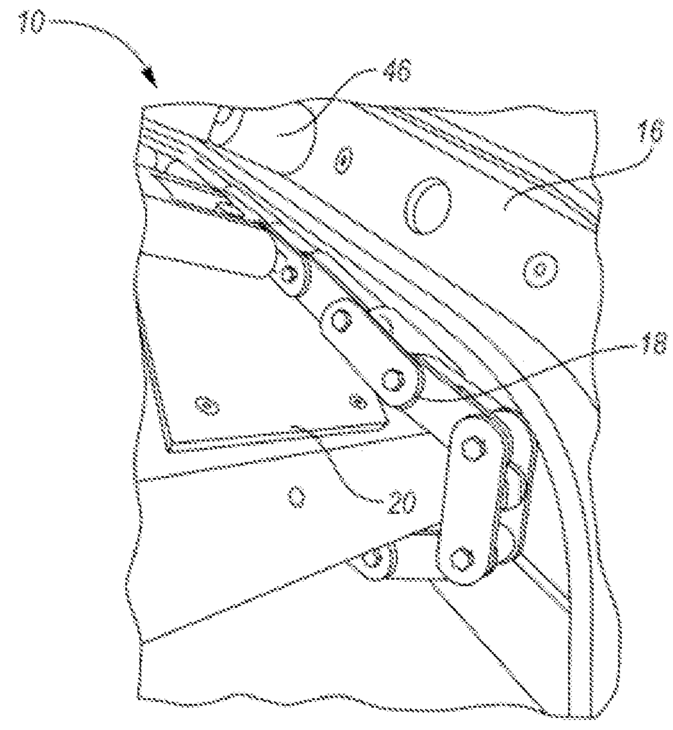
Figure 15:
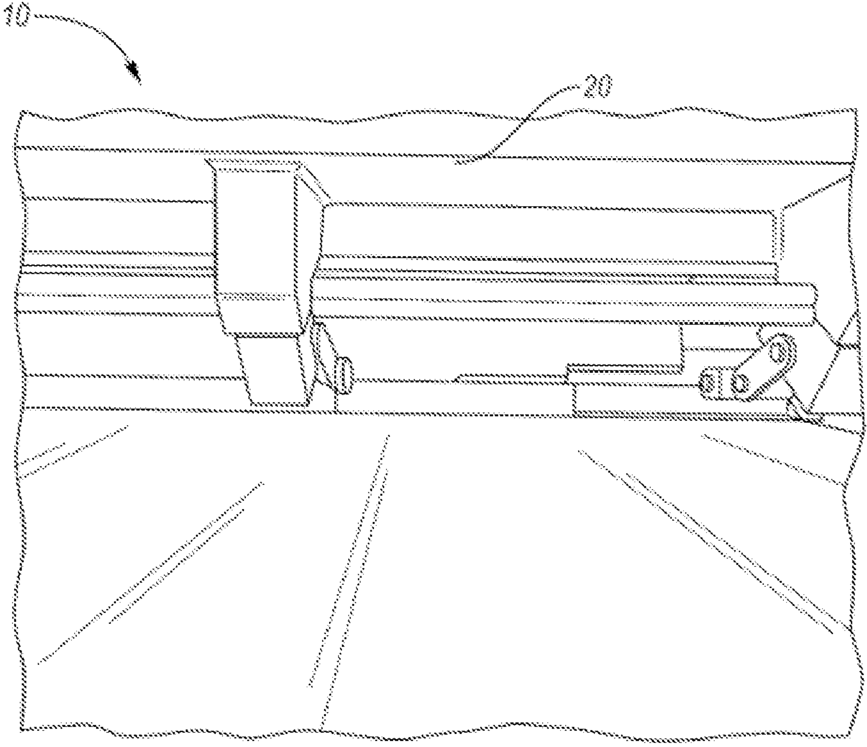
Figure 16:
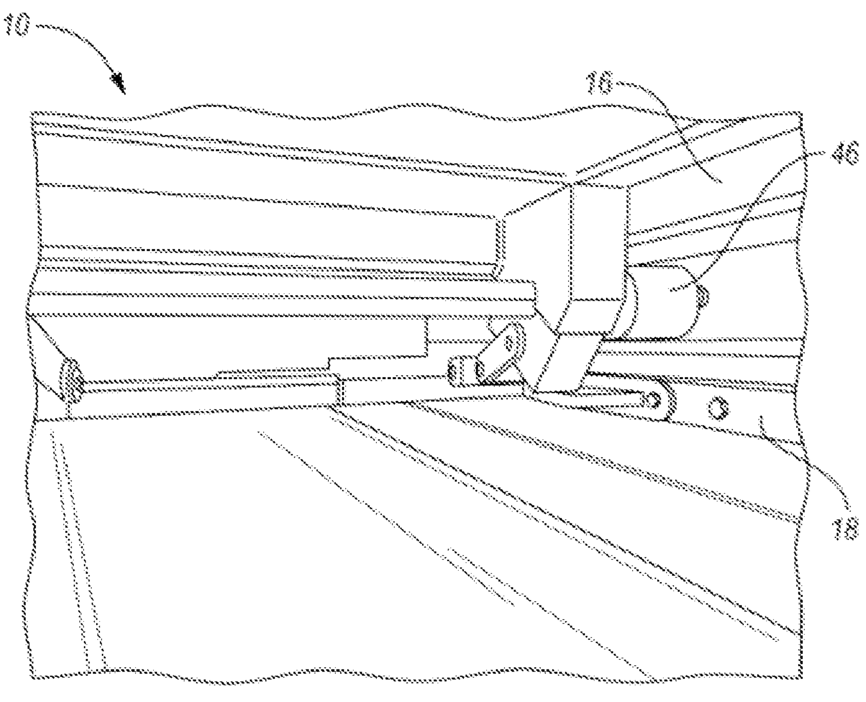
Figure 17:
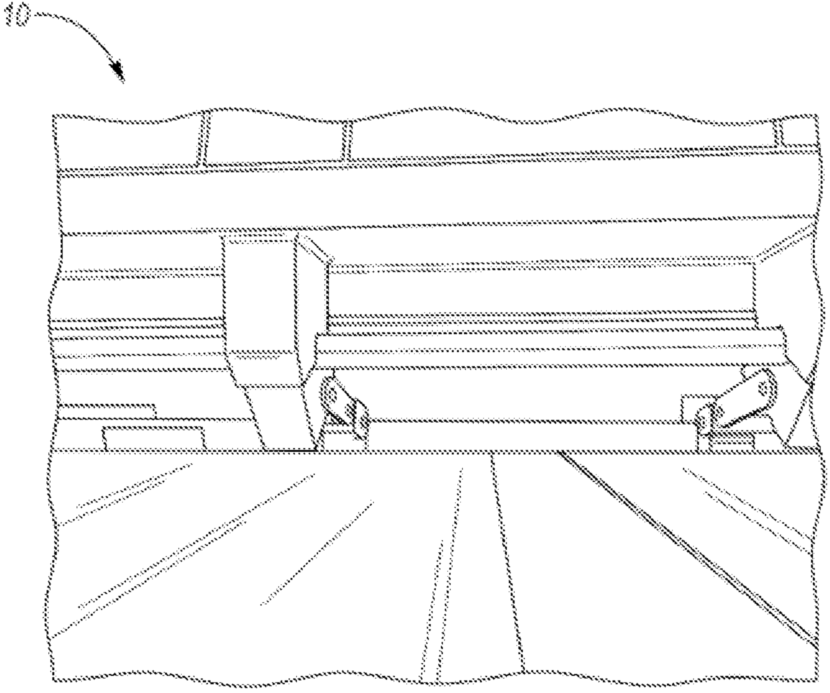
Figure 18:
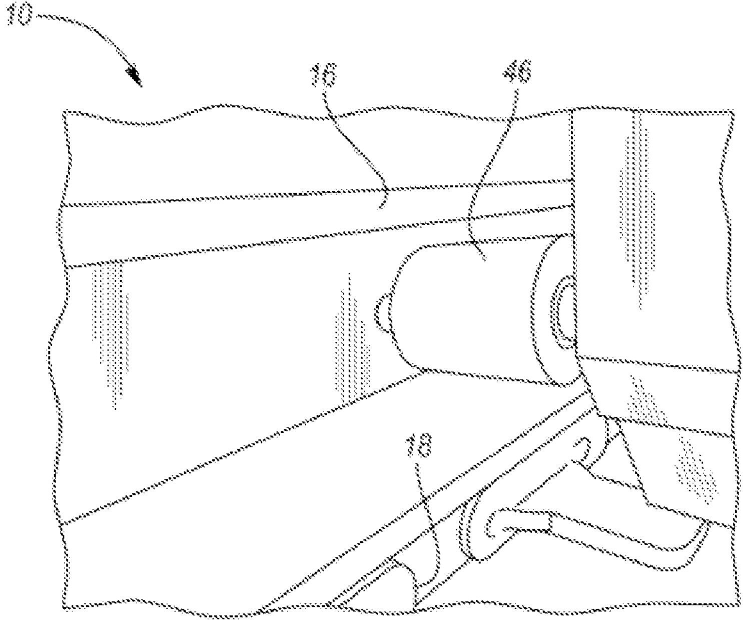

FIGS. 6-10 illustrate further embodiments with a bale 44 in the bale feeder 10. Referring to FIGS. 6, 9, and 10, a pallet 42 is shown below the bale 44. The bale 44 and the pallet 42 are placed on the floor 12. The platform 20 is located under the pallet 42 to help move the bale upwards towards the shredder 22. Looking at FIGS. 9 and 10, the platform 20 is illustrated further up the bale feeder 10 than in FIG. 6. This demonstrates that in this embodiment, the platform 20 will move upwards with the bale 44 and the floor 12.

FIGS. 11-18 illustrate further embodiments related to the bale feeder 10.

In FIGS. 11-18, certain other embodiments of the bale feeder 10 and various of its components can be seen.

The words used in the specification are words of description rather than limitation, and it is understood that various changes may be made without departing from the spirit and scope of the disclosure. As previously described, the features of various embodiments may be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A bale feeder assembly comprising:

a housing having side walls;

a feed assembly disposed between the side walls of the housing, the feed assembly having a support surface sized to receive a bale of material, a proximal end and a distal end, wherein the feed assembly is structured to move the bale of material;

a movable platform disposed between the side walls of the housing, the movable platform connected to the proximal end of the feed assembly to move the bale along the housing, and wherein the movable platform is rotatable between a generally horizontal position and a generally perpendicular position within to the housing; and a shredder disposed adjacent the distal end of the feed assembly to shred the bale, the feed assembly being disposed at an angle such that the proximal end is in a plane spaced below a plane the distal end is disposed in and the feed assembly with the movable platform is arranged to move the bale of material or a portion of the bale of material towards the shredder for shredding.

2. The bale feeder assembly of claim 1, further comprising a pair of rail members, wherein each individual rail members is connected to a respective one of the side walls and receives a respective roller associated with the movable platform.

3. The bale feeder assembly of claim 2, wherein the feed assembly comprises a drive chain disposed below at least one of the rail members, wherein the drive chain is structured to pull the movable platform towards the shredder.

4. The bale feeder assembly of claim 3, wherein the movable platform is attached to the drive chain, the drive chain structured to pull the movable platform from the generally horizontal position to the generally perpendicular position relative to the housing.

5. The bale feeder of claim 1, wherein the shredder comprises a spinning blade.

6. The bale feeder of claim 1, wherein the shredder comprises a plurality of spinning blades.

7. The bale feeder of claim 1, wherein the movable platform, when in the generally perpendicular position relative to the housing, moves along with the feed assembly to move the bale of material or the portion of the bale of material towards the shredder to generate a consistent feed rate of the bale of material to the shredder.

8. The bale feeder of claim 1, wherein the movable platform has a width of 75 to 225 cm and a length of 75 to 225 cm.

9. The bale feeder of claim 1, wherein the feed assembly comprises a plurality of spaced apart slats.

10. A bale feeder assembly comprising:

a housing having side walls;

a feed assembly disposed between the side walls of the housing, the feed assembly having a support surface sized to receive a bale of material, a proximal end and a distal end, wherein the feed assembly is structured to move the bale of material;

a movable platform disposed between the side walls of the housing, the movable platform connected to the feed assembly, and the movable platform is structured to move the bale along the housing between the sidewalls, and wherein the movable platform is pivotable between a first position and a second position within the housing, wherein the first position provides an angle between the movable platform and the feed assembly that is greater than when in the second position; and a shredder disposed adjacent the distal end of the feed assembly to shred the bale, the feed assembly disposed at an angle such that the proximal end is in a plane spaced below a plane the distal end is disposed in and the feed assembly with the movable platform is arranged to move at least a portion of the bale of material towards the shredder for shredding.

11. The bale feeder of claim 10, wherein the movable platform has a width of 75 to 225 cm and a length of 75 to 225 cm.

12. The bale feeder assembly of claim 10, further comprising a pair of rail members, wherein each individual rail members is connected to a respective one of the side walls and receives a respective roller associated with the movable platform.

13. The bale feeder assembly of claim 12, wherein the feed assembly comprises a drive chain disposed below at least one of the rail members, wherein the drive chain is structured to pull the movable platform towards the shredder.

14. The bale feeder assembly of claim 13, wherein the movable platform is attached to the drive chain, the drive chain structured to pull the movable platform from the generally horizontal position to the generally perpendicular position relative to the housing.

15. The bale feeder of claim 10, wherein the shredder comprises a plurality of spinning blades.

16. The bale feeder of claim 10, wherein the movable platform, when in the generally perpendicular position relative to the housing, moves along with the feed assembly to move the bale of material or the portion of the bale of material towards the shredder to generate a consistent feed rate of the bale of material to the shredder.

17. The bale feeder of claim 10, wherein the feed assembly comprises a plurality of spaced apart slats.

18. A bale feeder assembly comprising:

a housing having an inlet end and an outlet end;

a platform disposed within the housing, the platform being movable within the housing from the inlet end towards the outlet end, the platform sized to receive a bale of material within the inlet end of the housing;

a shredder disposed adjacent the outlet end of the feed assembly to shred the bale; and a driving member connected with the housing and the platform to drive the platform between the inlet and outlet ends of the housing.

19. The bale feeder of claim 18, wherein the platform is pivotable between a first position and a second position relative to the housing, wherein the first position provides an angle between the platform and the housing that is greater than when in the second position; and the housing disposed at an angle such that the inlet end is in a plane spaced below a plane the outlet end is disposed in, and the platform is arranged to move at least a portion of the bale of material towards the shredder for shredding.

20. The bale feeder of claim 19, wherein the platform has a width of 75 to 225 cm and a length of 75 to 225 cm.

* * * * *